6 Sheets--Sheet 1.

E. H. THURSTON.
Modes of Cutting out Uppers for Shoes.

No. 136,561. Patented March 4, 1873.

Witnesses,
W. J. Cambridge
J. E. Teschemacher

Inventor,
Edward H. Thurston
Per his Attorneys
Teschemacher & Stearns

6 Sheets--Sheet 3.

E. H. THURSTON.
Modes of Cutting out Uppers for Shoes.

Figure 3:
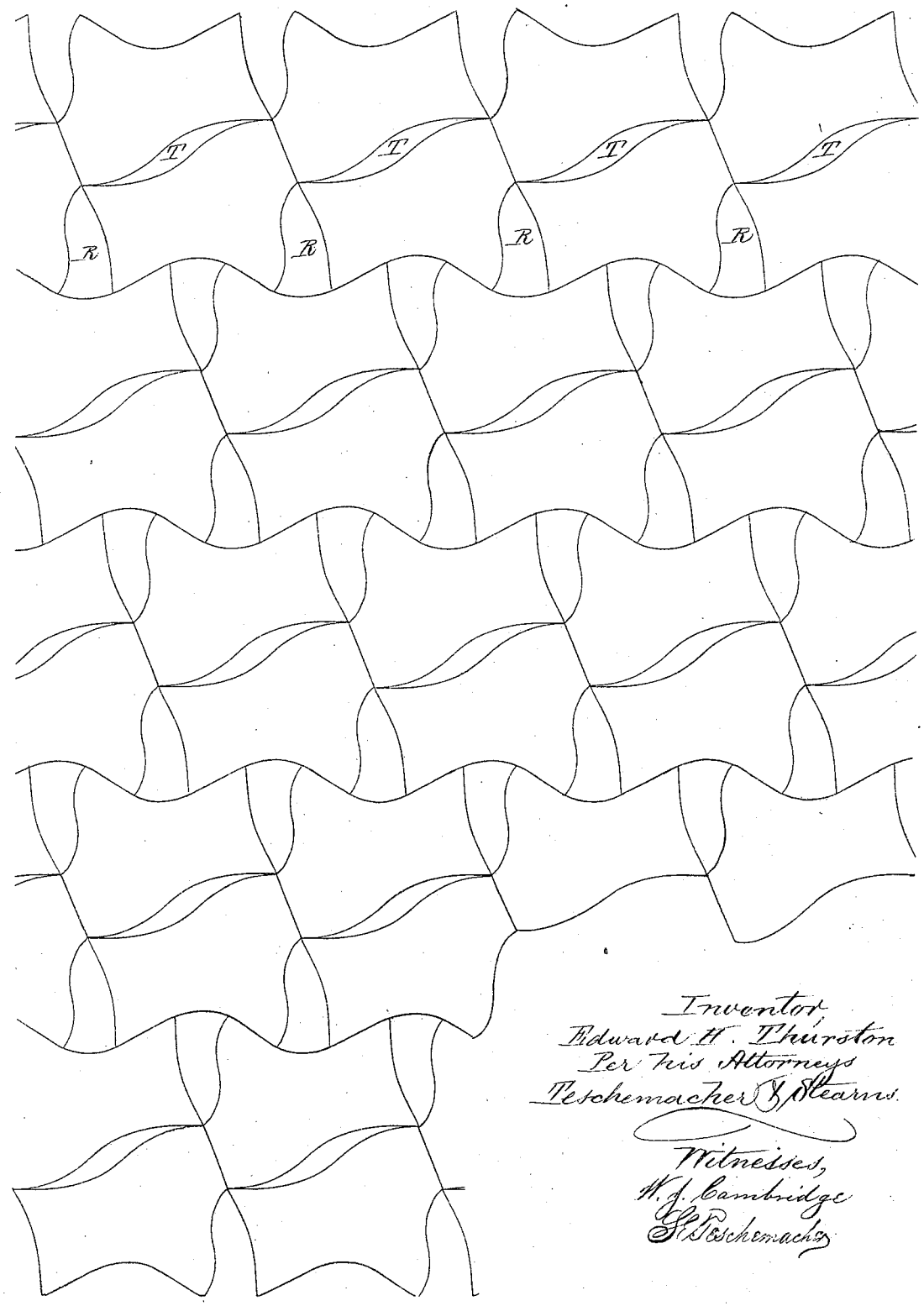

No. 136,561. *Fig. 3* Patented March 4, 1873.

6 Sheets--Sheet 4.

E. H. THURSTON.
Modes of Cutting out Uppers for Shoes.

No. 136,561. Patented March 4, 1873.

Witnesses,
W. J. Cambridge
C. C. Cambridge

Inventor,
Edward H. Thurston,
Per his Attorneys
Teschemacher & Stearns

6 Sheets--Sheet 5.

E. H. THURSTON.
Modes of Cutting out Uppers for Shoes.

No. 136,561. Patented March 4, 1873.

E. H. THURSTON.
Modes of Cutting out Uppers for Shoes.

No. 136,561.      Patented March 4, 1873.

UNITED STATES PATENT OFFICE.

EDWARD H. THURSTON, OF MONTREAL, CANADA, ASSIGNOR TO HIMSELF AND ROGER BOYD, OF MARLBOROUGH, MASSACHUSETTS.

IMPROVEMENT IN THE MODES OF CUTTING OUT UPPERS FOR SHOES.

Specification forming part of Letters Patent No. 136,561, dated March 4, 1873.

*To all whom it may concern:*

Be it known that I, EDWARD H. THURSTON, of Montreal, in the Province of Quebec and Dominion of Canada, have invented an Improved Method of Cutting out the "Quarters" of Boots and Shoes, of which the following is a full, clear, and exact description, reference being had to the accompanying drawing making part of this specification, in which—

Figure 1:
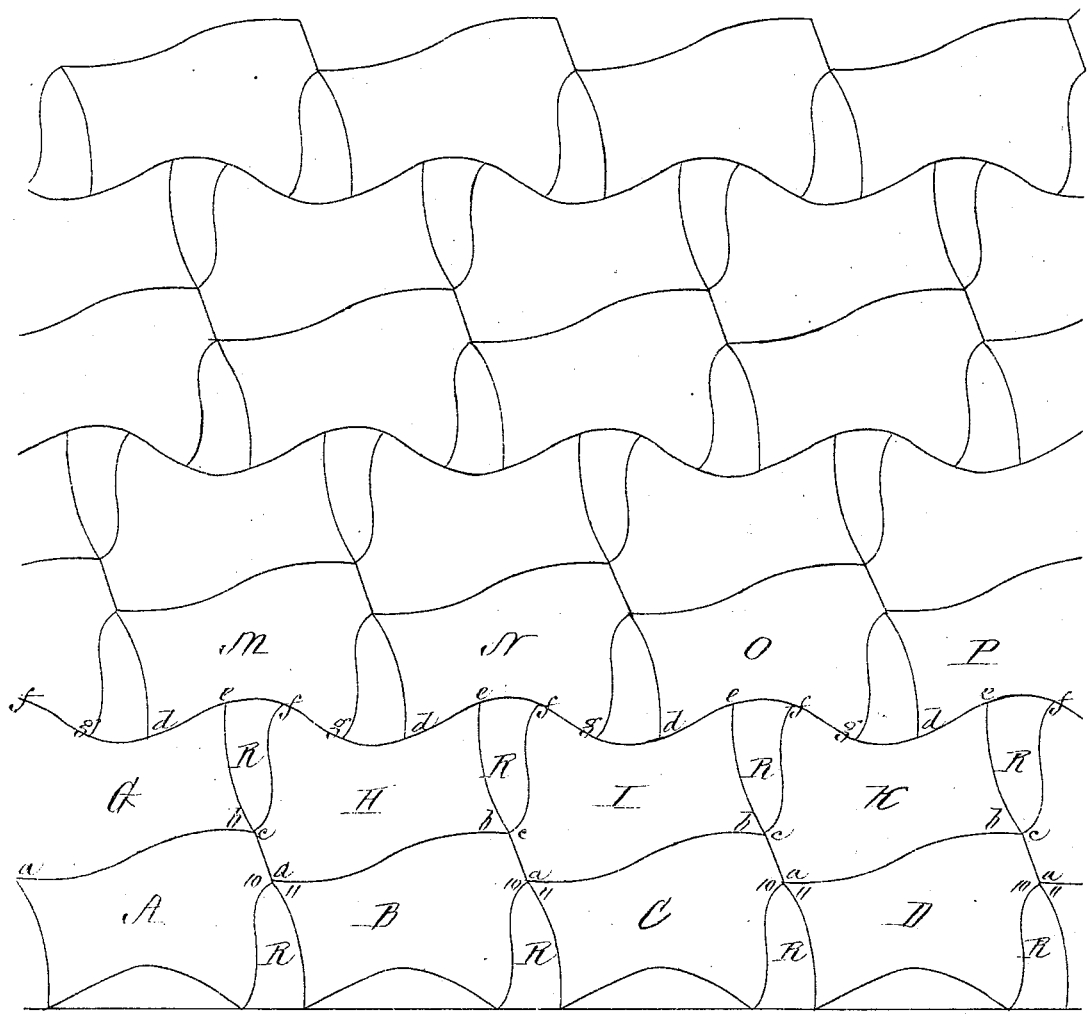
Figure 2:
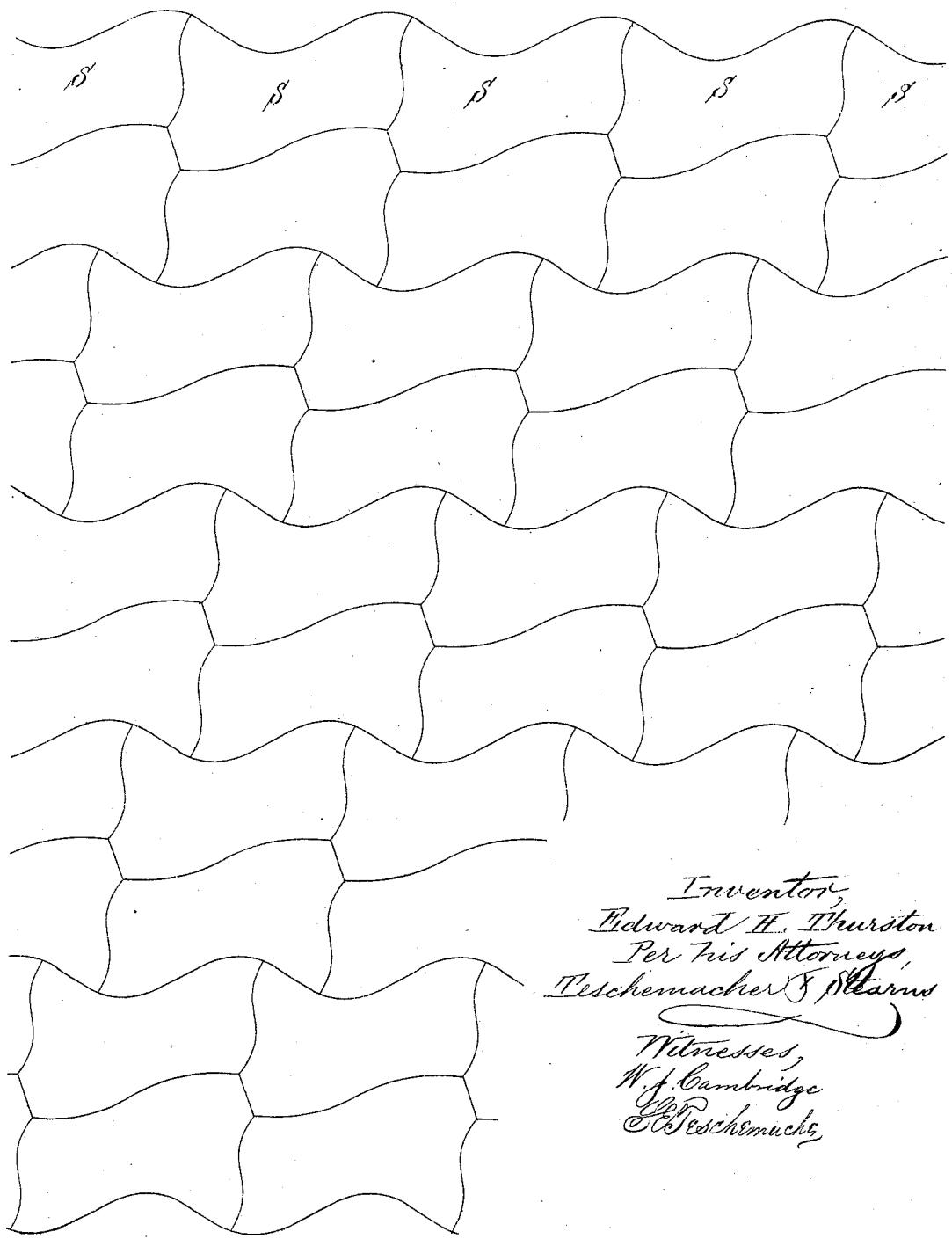
Figure 4:
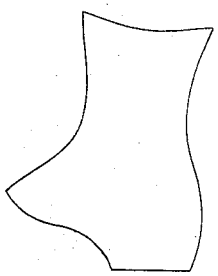
Figure 5:
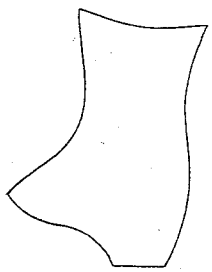
Figure 6:
Figure 8:
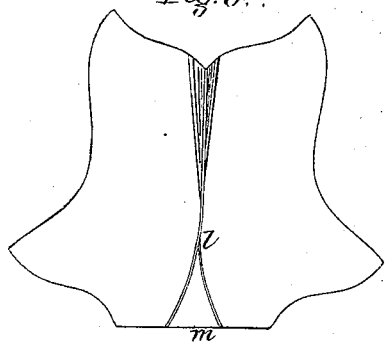
Figure 7:
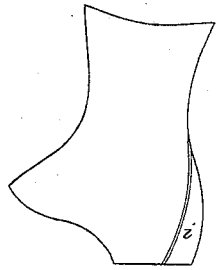
Figure 9:
Figure 10:
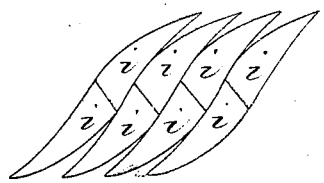
Figure 11:
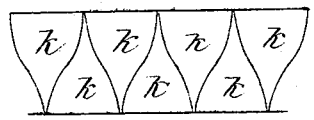
Figure 12:
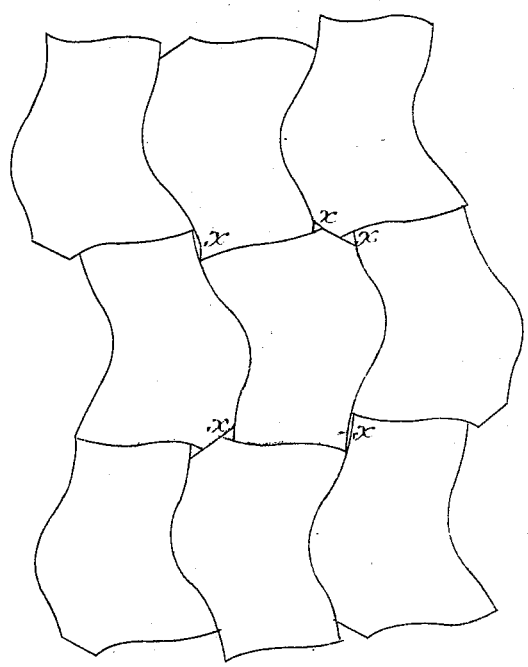
Figure 1:
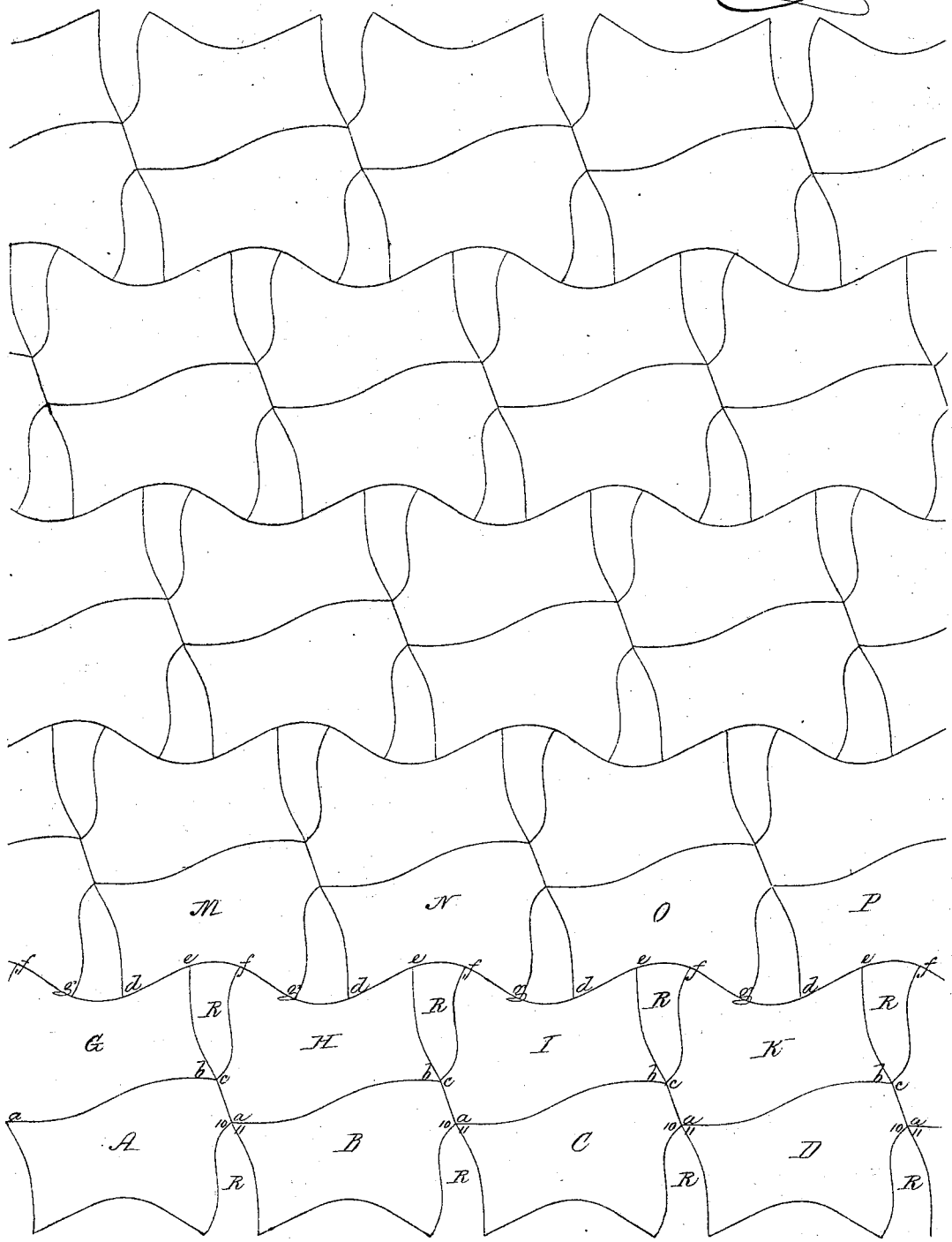

Figure 1 is a plan illustrating my method of cutting quarters of boots and shoes from a piece of leather, serge, or other suitable material. Fig. 2 is a plan, also illustrating my method of cutting out quarters, the form of the pattern being varied at its top. Fig. 3 is a plan representing the old method of cutting out quarters. Fig. 4 is a plan of a quarter of the old pattern. Figs. 5 and 6 represent the two pieces of a quarter cut in accordance with my invention. Fig. 7 represents a complete quarter formed by uniting the pieces shown in Figs. 5 and 6. Fig. 8 represents two quarters of the form seen in Fig. 2, the upper portions being sewed together. Fig. 9 represents the piece which is secured between the heel portions of the two quarters shown in Fig. 8. Figs. 10 and 11 are details; Fig. 12, modification, to be referred to.

To utilize the greatest percentage of the stock employed in cutting out the quarters of boots and shoes is the object of my invention, which consists in a method of cutting in which a portion of the "counter" or heel portion of the quarter is omitted, so that two quarters when reversed will accurately fit together on the line of the back seam, thereby avoiding the waste which has heretofore occurred at this point, the piece left between the top of one quarter and the bottom of another being utilized to complete the counter or heel portion of the quarter previously omitted; but when the form of the top of the quarter is such that no piece is left in cutting, the portion required to complete the quarter must be cut from a separate piece of stock.

To enable others skilled in the art to understand and use my invention, I will proceed to describe the manner in which I have carried it out.

A piece of stock, of any suitable size, being laid upon a table, a row of quarters, A B C D, of the pattern shown in Figs. 1 and 5, is cut therefrom across the width of the stock by a die or otherwise, the point 11 of one quarter fitting against the point 10 of the one to the left. The die or pattern is then reversed, when the second row of quarters G H I K is cut therefrom so that the quarters of the first and second rows will fit accurately together on the lines *a b* of the back seams, thereby avoiding all waste of stock at this point, while the line *a c* of each quarter of the second row will coincide with the corresponding line *a c* of the quarter to the left in the first row. The third row of quarters M N O P is now cut in such manner that the lines *d e* and *f g* of each one will coincide with the corresponding lines *d e* and *f g* of two contiguous quarters in the row below. The remaining rows of quarters are then cut in the same manner as above described, a piece of stock, R, Fig. 1, being left between every two contiguous quarters of each row.

It will be seen that the counter or heel portion of each of the quarters cut after my improved method is omitted; and in order to give the quarter its proper shape, as seen in Fig. 4, it becomes necessary to sew or otherwise attach a piece, *i*, Fig. 6, thereto, as seen in Fig. 7; and the pieces R, above referred to, are utilized for this purpose, the pieces *i* being cut therefrom, thus also avoiding the waste which has heretofore occurred between the top and bottom of two contiguous quarters in the same row.

When a pattern of quarter S, Fig. 2, having its top elevated and rounded in front, and known as "Thurston's Grecian Bend," is to be cut, there are no pieces R left between the quarters, the top of one quarter and the bottom of another precisely coinciding with each other, in which case a piece, *k*, of the form seen in Fig. 9, is cut from a separate piece of stock to complete the counter or heel portion of the quarters, as seen in Fig. 8, whereby I avoid a seam from *l* to *m*, which would be necessary if a piece, *i*, Fig. 6, was sewed to each quarter and the two quarters then sewed together.

Where the pieces *i* are cut from whole stock I prefer to arrange them as seen in Fig. 10, as very little waste is made in cutting them; and when the pieces $k$ are cut from whole stock I prefer to arrange them as seen in Fig. 11.

Fig. 12 represents a series of quarters of the configuration required to form "lower-cut uppers" for shoes. Here the arrangement is similar to that shown in Fig. 2, a very small waste, $x$, only occurring. In this case the heel portion of each quarter is completed by the addition of a piece similar to $i$, above described, but somewhat larger.

It will be readily seen, from a comparison of the old method of cutting the whole quarter in one piece, Fig. 3, with my improved method of cutting, Figs. 1 and 2, in which the quarter is formed of two pieces, that the waste pieces T, Fig. 3, do not occur, while the pieces R which occur in cutting quarters of the pattern shown in Fig. 1, and which are wasted in cutting the pattern of quarter seen in Fig. 3, are utilized in completing the counter or heel portions of the quarters, as before described; consequently I am enabled to cut from a piece of stock of a given size many more quarters than can be cut by the old method, where the quarter is cut at one operation in a single piece, and a great saving in stock—say about twenty per cent.—is thus effected, while the cost of sewing the pieces $i$ to the quarters is very trifling.

Claim.

What I claim as my invention, and desire to secure by Letters Patent, is—

The within-described method of cutting and making quarters for boots and shoes, in which a part of the counter or heel portion of the quarter is omitted, and the piece required to complete the quarter afterward secured thereto, substantially as and for the purpose set forth.

Witness my hand this 3d day of July, A. D. 1872.

EDWARD H. THURSTON.

In presence of—
EDWARD J. KEMP,
E. T. KYLE.